E. FRANKE.
BUTTER CUTTING MACHINE.
APPLICATION FILED AUG. 25, 1913.
1,135,005.
Patented Apr. 13, 1915.
2 SHEETS—SHEET 1.
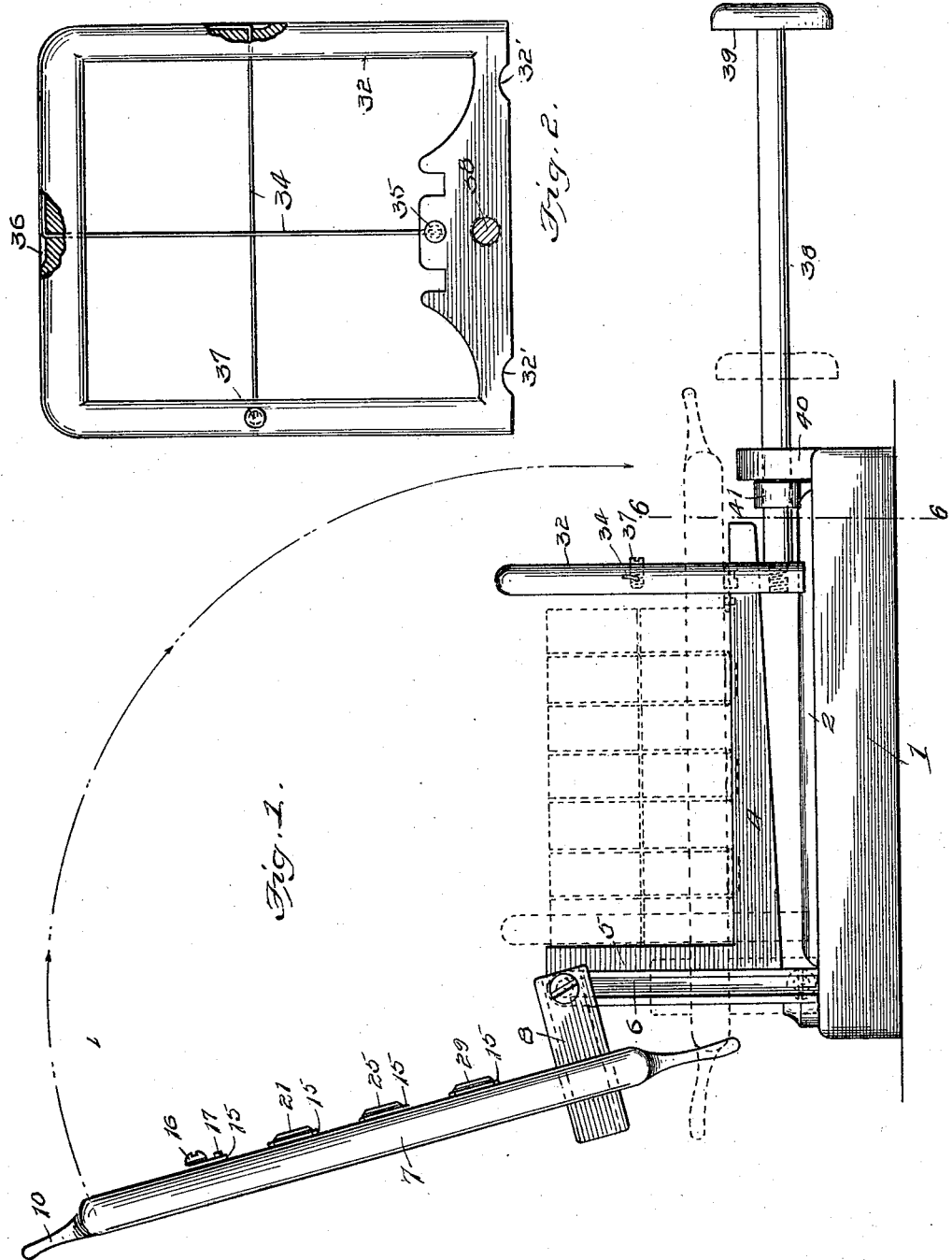
Witnesses.
Fred J. Pearson
James Jones
Inventor:
Edwin Franke,
By Oliver M. Olson
Atty.

E. FRANKE.
BUTTER CUTTING MACHINE.
APPLICATION FILED AUG. 25, 1913.
1,135,005.
Patented Apr. 13, 1915.
2 SHEETS—SHEET 2.
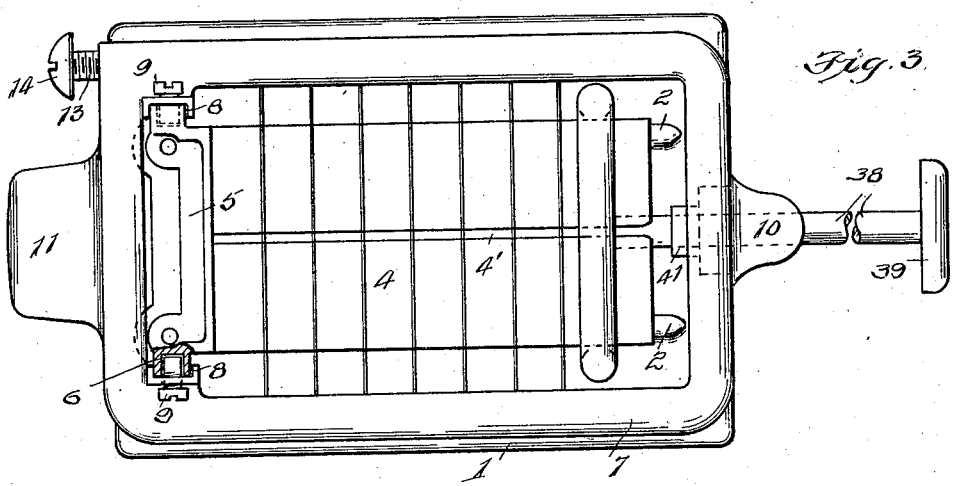
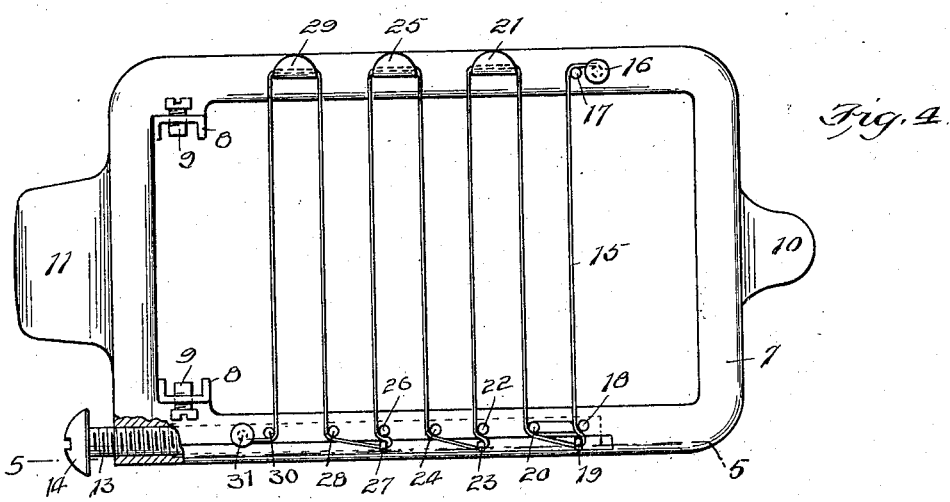
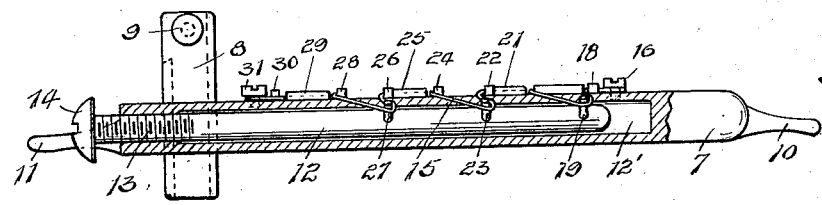
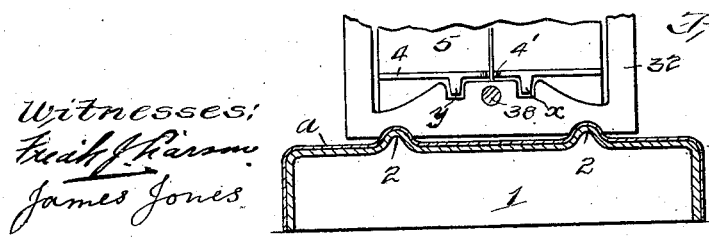
Witnesses:
Inventor:
Edwin Franke,

UNITED STATES PATENT OFFICE.

EDWIN FRANKE, OF CHICAGO, ILLINOIS.

BUTTER-CUTTING MACHINE.

1,135,005.  Specification of Letters Patent. Patented Apr. 13, 1915.

Application filed August 25, 1913. Serial No. 786,535.

*To all whom it may concern:*

Be it known that I, EDWIN FRANKE, a citizen of Chicago, in the county of Cook and State of Illinois, have invented certain new and useful Improvements in Butter-Cutting Machines, for which I hereby apply for Letters Patent, and of which the following is a specification.

The object of my invention is to provide a butter cutter comprising a rectangular frame having horizontal wires that slice the brick of butter upon the platform of the machine vertically and transversely, that can be raised up and out of the way in such a manner as not to interfere with the hands of the operator in removing the butter or when replacing a fresh brick of butter upon the platform preparatory to cutting it into squares.

Another object of my invention is to provide means whereby the transverse wires of this frame may be tightened simultaneously, quickly and easily.

These and other objects I accomplish by simple and economically constructed means hereinafter fully described, and as particularly pointed out in the claims.

In the drawings, Figure 1 is a side view of my invention. Fig. 2 is a front elevation of the rectangular vertically disposed cutting frame separated from the machine and with the shaft of the bar employed to reciprocate it, in section. Fig. 3 is a plan view of said machine. Fig. 4 is a plan view of the underside of the horizontal cutter-frame, showing one corner thereof in section. Fig. 5 is a vertical section through said frame taken on dotted line 5—5, Fig. 4. Fig. 6 is a transverse section of the lower portion of the machine, taken on dotted line 6—6, Fig. 1.

Referring to the drawings, 1 represents a horizontal rectangular base the outer surface of which is preferably covered by a coat of porcelain *a*, and the flat top of which is provided with longitudinal ribs 2, 2, that extend from near the front end of the base to near the rear end thereof. At the center of its front end this base is provided with a vertically projecting guide-lug 40, which is, preferably, provided with a cylindrical extension 41 extending rearwardly therefrom concentric to a horizontal opening made longitudinally through said lug.

Near the rear end of the base, preferably, at points in alinement with the ribs 2, vertical standards are secured thereto by means of suitable screws, substantially as shown. These standards have a rectangular platform 4 projecting horizontally forward toward the forward end of the base, which is, preferably, cast in one piece therewith, and above this platform said standards are connected by a transverse wall 5 the forward surface of which is, preferably, at right angles to the bed of the platform and constitutes a back for the same.

Platform 4 is provided with a longitudinal slot 4' that extends from its front edge to wall 5 midway between its longitudinal side, and this slot is designed to accommodate and permit the longitudinal passage therethrough of the vertical stretch of a cutting wire 34, which is carried by a vertically disposed rectangular cutting frame 32. The lower horizontal member of frame 32 passes under platform 4 and it is secured to the rear of a longitudinally disposed push-bar 38 which latter extends longitudinally through the guide-lug 40 and its extension 41 and has a knob 39 on its forward end.

The horizontal member of rectangular frame 32 is provided with two recesses 32' in its under edge that are adapted to ride upon ribs 2 of the base, and the upper edge of this lower member is raised mediate its ends and is provided with recesses *x* on either side of its center of length that are engaged by longitudinally extending tenons *y* depending from the underside of platform 4, substantially as shown in Fig. 6 of the drawings.

One end of wire 34 extends down through a small aperture (not shown) in the center of length of the upper edge of the lower horizontal member of the vertical frame 32, and is secured by a set-screw 35. From thence this wire 34 extends vertically up through a suitable aperture made in the upper horizontal member of said vertical frame, as shown in Fig. 2 of the drawings, and then traverses a longitudinal groove 36 extending, as shown in the drawings, longitudinally in the upper edge of the upper member to the right, around the upper right hand corner and then longitudinally downward in the outer edge of the right hand vertical member of said vertical member of said vertical rectangular frame a distance corresponding to about one-half of the width of the space inclosed by said vertical rectangular frame. It then passes transversely and horizontally through a suitable aperture in the right hand vertical member of said vertical slicing frame to and through the left hand vertical member thereof where it is secured by a set-screw 37. Both the vertical and the horizontal stretches of this wire 34 are drawn taut, and should said wire become loose it could be easily tightened by means of set-screws 35 and 37.

The outer vertical side edges of standards 6 are provided with vertical grooves which extend from the base of the standards to near the upper ends thereof, to receive the stripped ends of guide-screws 9 that are tapped laterally through the outer connecting web of channel-shaped lugs 8 which latter are made integral with the inner rear angles or corners of the horizontally disposed rectangular cutting frame 7. When this frame 7 is in a horizontal position, substantially as shown in dotted lines in Fig. 1, these guide-screws can be moved vertically up and down in the guide-grooves in the standard and thus enable said frame to be correspondingly moved, and when this frame 7 is moved to the limit of its vertical movement over platform 4 said screws will have reached the upper limits of said guide-grooves and can be swung upward to the rear of the standards on the transverse axis of its rear member—the lower ends of the rear flanges of the channel-shaped lugs 8 being cut away sufficiently to permit said cutting frame to be thus swung backward, as shown in Fig. 1 of the drawings, in which position said frame is supported by the lower ends of the forward flanges of said channel-shaped lugs resting on the tops of the standards. The forward and rear transverse members of frame 7 are provided with longitudinally projecting lugs 10 and 11, and these lugs are grasped by the operator, when said frame is swung downward into the horizontal position, and moved vertically to and from the plane of the platform to cut the butter. The side-members of the horizontal cutting frame 7 are connected by the transverse stretches of a wire 15, and the underside of, say, the right hand longitudinal member of this frame is provided with a series of downwardly projecting pins 19, 20, 22, 24, 26 and 30, and the underside of the left hand longitudinal member of said frame is provided with a series of depending bosses 21, 25 and 29, and with a pin 17, for the guidance of wire 15. The right hand longitudinal member of said frame 7 is made tubular and its bore 12' extends from the rear end thereof to near the front end thereof, and the rear of this bore is, preferably, slightly reduced in diameter and screw-threaded to permit the insertion of the smooth portion of a bolt 12 and permit the screw-threaded mouth of the same to be engaged by the threaded portion 13 of the bolt adjacent to the head 14 thereof. At points in the same transverse plane as pins 18, 22 and 26, the smooth part of bolt 12 is provided with a series of pins 19, 23 and 27 that project out through suitable slots in the underside of the longitudinal member of cutting-frame 7 in which said bolt is placed. One end of wire 15 is secured to the barrel of a set-screw 16 tapped into the left hand longitudinal member of frame 7 near its forward end, and from thence it is threaded around pin 17 and then transversely across the open space between the longitudinal members to pin 18; then around pin 19 on bolt 12, thence to and around pin 20, and then transversely across to the opposite longitudinal member of frame 7 around the recessed outer side of boss 21; thence back across to the first mentioned side member to and around pin 22; then around pin 23 projecting from the bolt; then to and around pin 24; then transversely across to boss 25 around the recessed outer side thereof; back across to pin 26, and thence to pin 27 projecting from the bolt; thence to pin 28 across boss 29 around its recessed outer edge back across to pin 30 to a set screw 31, to which latter and by means of which the rear end of said wire 15 is secured. Now, it will be apparent that by tightening up bolt 12, pins 19, 23 and 27 will move longitudinally, and simultaneously tighten all the transverse stretches of wire 15.

In operation, a brick of butter is placed upon the platform 4 with its rear end against wall 5 after the vertical frame has been drawn to the front end of the platform. The vertical frame is then pushed to the rear until it bears against wall 5, and wire 34 cuts the brick longitudinally into four corresponding sections each of which will be substantially square in cross-section. The horizontal cutting frame 32 is then swung into a horizontal position over the brick of butter and then is moved downward in its horizontal position so that the transverse stretches of wire 15 cut the brick of butter transversely into, say, thirty-six squares of butter each about one-half inch in thickness. This can be done quickly and neatly without the loss of any butter by my improvements, which are particularly useful in boarding-houses, hotels, restaurants, and other places of gastronomic economy.

What I claim as new is:

1. In a butter cutting machine, a horizontal platform, vertical standards extending from said platform and having longitudinal grooves that terminate below the top thereof, a movable cutting frame, transverse channel shaped lugs extending from the cutter-frame in the channels of which the vertical standards project, and an element projecting from each of the channel lugs and slidably and rockably fitting in the groove of the standard.

2. In a butter cutting machine, a horizontal platform, vertical standards extending from said platform and having longitudinal grooves that terminate below the top thereof, a movable cutting frame, transverse channel shaped lugs extending from the cutter-frame in the channels of which the vertical standards project, and a removable screw in each channel lug having a projecting end slidably and rockably fitting in the groove of the standard.

3. In a butter cutting machine, a horizontal platform, vertical standards extending from said platform and having longitudinal grooves that terminate below the top thereof, a movable cutting frame, transverse channel-shaped lugs extending from the cutter-frame in the channels of which the vertical standards project, a removable screw in each channel lug having a projecting end slidably and rockably fitting in the groove of the standard, and a portion of the side flange of the channel lug in the vicinity of said screw being suitably cut away to permit said cutting frame to be rocked on the axis of said screw at the limit of its upward movement.

In testimony whereof I affix my signature in presence of two witnesses.

EDWIN FRANKE.

Witnesses:
OLIVER M. OLSON,
JAMES M. DOWDNEY.

Copies of this patent may be obtained for five cents each, by addressing the "Commissioner of Patents, Washington, D. C."